US007080982B2

United States Patent
Rawlins et al.

(10) Patent No.: US 7,080,982 B2
(45) Date of Patent: Jul. 25, 2006

(54) INFORMATION DISPLAY MEDIA WITH CONCEALABLE PORTION

(75) Inventors: Robert Rawlins, Medina, OH (US); Frank Stinga, North Olmsted, OH (US); Polly DeHays, Medina, OH (US); Theresa Gamble, Bay Village, OH (US); Kelly Yost, North Olmsted, OH (US)

(73) Assignee: American Greetings Corporation, Cleveland, OH (US)

( * ) Notice: Subject to any disclaimer, the term of this patent is extended or adjusted under 35 U.S.C. 154(b) by 74 days.

(21) Appl. No.: 10/408,602

(22) Filed: Apr. 7, 2003

(65) Prior Publication Data

US 2004/0197760 A1    Oct. 7, 2004

(51) Int. Cl.
*G09B 19/00*    (2006.01)
(52) U.S. Cl. ...................................... 434/156
(58) Field of Classification Search ................ 434/129, 434/157, 159, 167, 170, 188, 156; 273/299, 273/300, 301, 302
See application file for complete search history.

(56) References Cited

U.S. PATENT DOCUMENTS

| | | | | |
|---|---|---|---|---|
| 1,656,030 | A * | 1/1928 | Waring | 434/207 |
| 1,745,946 | A * | 2/1930 | Murray | 273/296 |
| 1,755,853 | A * | 4/1930 | Waring | 434/167 |
| 2,628,435 | A * | 2/1953 | Minninger et al. | 434/167 |
| 2,824,389 | A * | 2/1958 | Orebaugh | 434/167 |
| 3,744,154 | A * | 7/1973 | Pott | 434/167 |
| 3,789,517 | A * | 2/1974 | Romstad | 434/199 |
| 4,734,036 | A * | 3/1988 | Kasha | 434/157 |
| 4,770,638 | A | 9/1988 | Jabour et al. | |
| 5,409,381 | A * | 4/1995 | Sundberg et al. | 434/159 |
| 5,797,601 | A | 8/1998 | Ritchie | |
| 5,951,298 | A | 9/1999 | Werzberger | |
| 6,056,549 | A * | 5/2000 | Fletcher | 434/112 |
| 6,646,648 | B1 * | 11/2003 | Donham | 345/582 |
| 6,676,414 | B1 * | 1/2004 | MacHendrie et al. | 434/201 |

* cited by examiner

*Primary Examiner*—Kurt Fernstrom
(74) *Attorney, Agent, or Firm*—Roetzel & Andress

(57) ABSTRACT

A flash card or other type display member is disclosed in which one or more display surfaces are provided for displaying a first indicia, preferably educational indicia. A flap is provided on display surface for optionally revealing a second indicia associated with the first indicia.

15 Claims, 3 Drawing Sheets

INFORMATION DISPLAY MEDIA WITH CONCEALABLE PORTION

FIELD OF THE INVENTION

The present invention pertains generally to printed media and educational media, and flash cards in different types of mediums.

BACKGROUND OF THE INVENTION

Flash cards are well known tools for presenting educational facts to young learners. A typical flash card presents an educational element on an obverse side of the card, and an associated educational element on the reverse side. For example, a typical flash card can show an arithmetic problem on the obverse, and the solution on the reverse. Other type flash cards can be used to teach children colors, numbers, letters of the alphabet, names of animals and inanimate objects, etc.

Flash cards do have certain drawbacks. Since the front and back sides are the only display surfaces available, only two educational elements per card can be presented. In this way, a large deck of flash cards are required, which can take up much space and may require much fumbling on the part of a user to sort and organize the cards. Also, it can happen that flash cards are dropped or placed with the wrong side facing the user. In this way, a user can see an "answer" before seeing the "question" and this spoils the lesson of the flash card for at least a given session.

Some flash card types are known which include a separate component for concealing the answer side of a card. But such separate components are a drawback since the use of the flash card is dependent on the component. If the component is lost, the usefulness of the flash cards is diminished. Also, such additional components require separate manufacture, adding to the production and shipping costs of a set of flash cards.

Also, in a typical flash card, the questions and answers are presented on opposite sides which cannot be viewed simultaneously. Thus, the cards must be flipped, and this may pose an impediment to learning since the association of educational elements cannot be directly reinforced.

SUMMARY OF THE INVENTION

The difficulties and drawbacks associated with previous-type systems are overcome by the flash card system of the present invention in which one or more display surfaces are provided for displaying a first educational indicia. A hingably-mounted flap is provided on the display surface for optionally revealing a second educational indicia associated with the first educational indicia.

As will be realized, the invention is capable of other and different embodiments and its several details are capable of modifications in various respects, all without departing form the invention. Accordingly, the drawings and description are to be regarded as illustrative and not restrictive.

DETAILED DESCRIPTION OF THE INVENTION

Figure 1A:
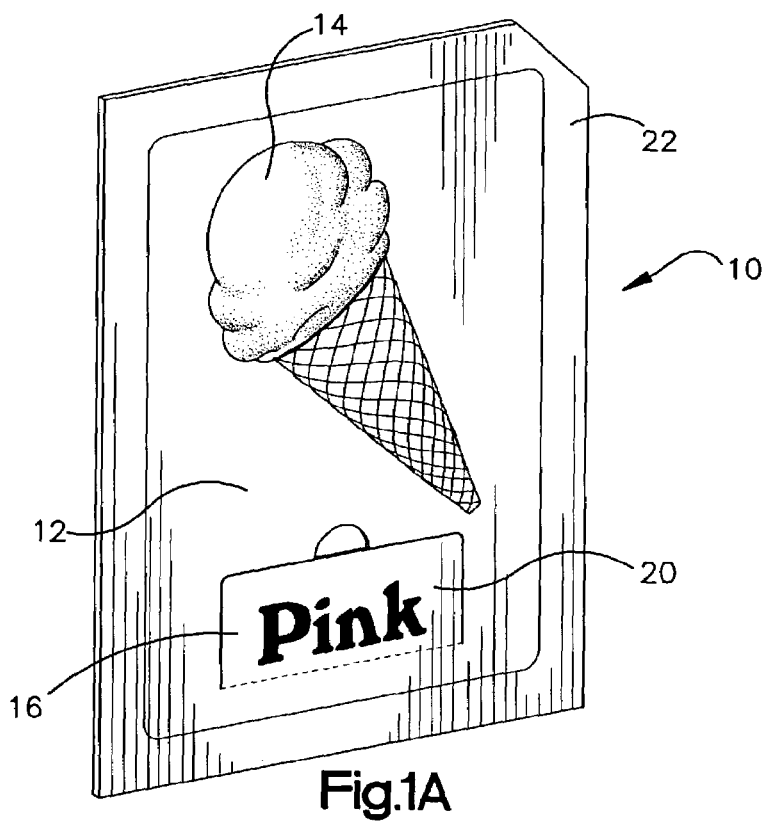
FIGS. 1A and 1B respectively show an embodiment of the present invention with a closed flap and an open flap.
Figure 1B:
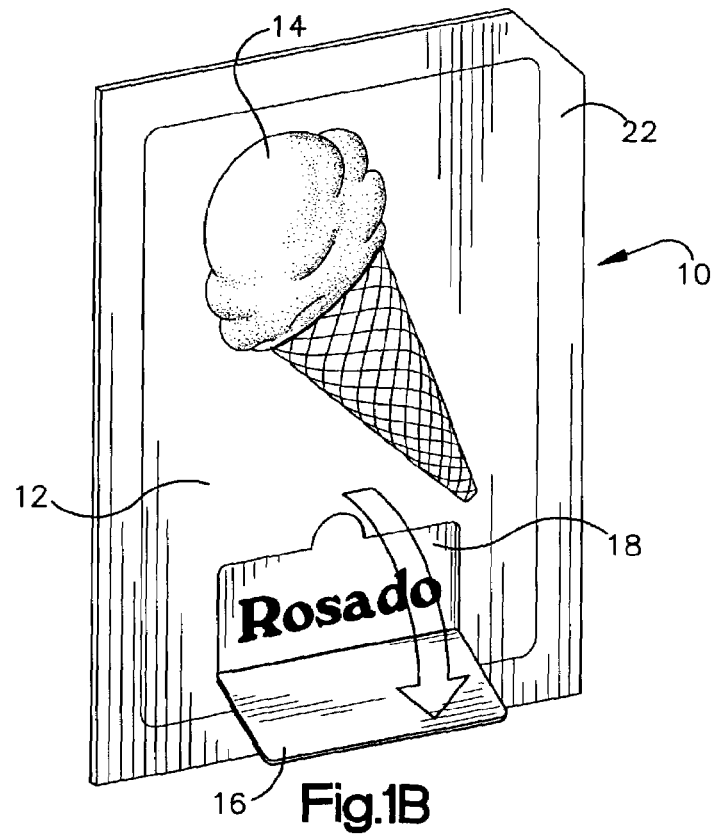

The Figures illustrate alternate embodiments of the invention directed to a flash card used to present educational material to a student learner. As shown in FIGS. 1A and 1B, the flash card 10 is preferably a flat member having one or more display surfaces 12. The display surface 12 is used for displaying one or more first educational indicia. As shown in FIGS. 1A and 1B, the first educational indicia can be an illustration 14 or other such graphical representation.

A flap 16 is provided on the respective display surface 12 for optionally revealing a second educational indicia associated with the first educational indicia. The flap 16 may be attached to the card by a hinge or other suitable connection. As shown in FIGS. 1A and 1B, the second educational indicia can be a word 18 or other type of alphanumerical text indicia or information. As shown in FIG. 1A, the second educational indicia is essentially covered by the flap in a closed position. And as shown in FIG. 1B, the flap can be optionally flipped down to an open position to reveal the second educational indicia.

Figure 2:
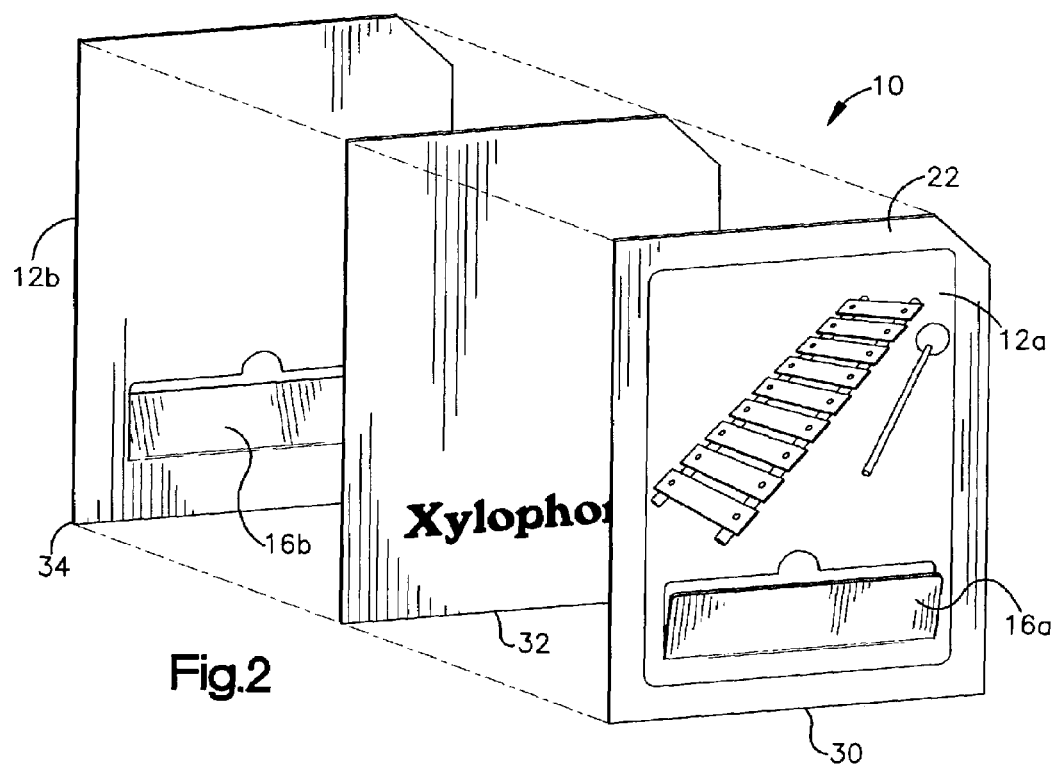
FIG. 2 depicts the laminate construction of a preferred embodiment of the present invention.
Figure 3:
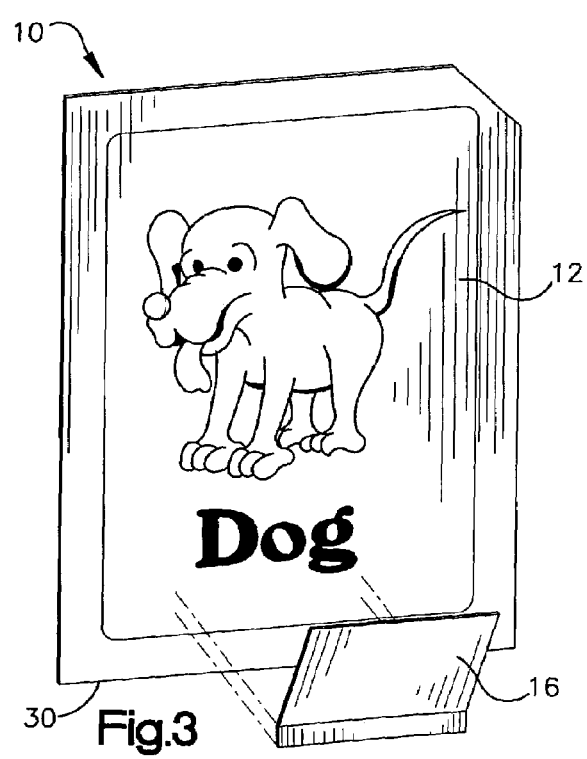
FIG. 3 illustrates the construction of an alternative embodiment of the present invention.

The first and second educational indicia can be of any desired form, preferably to impart and educational lesson, or to assist in the memorization of educational facts. For example, the first educational indicia can be in the form of a question and the second educational indicia can be revealed to show the answer to the question. The respective questions and answers can of any type, including mathematics, language, history and science. It should be understood that one or both of the first and second educational indicia can be graphical indicia, i.e. illustrations, photographs, symbols or any other such graphical depictions. Also, one or both of the first and second educational indicia can be alphanumerical indicia, such as words, numbers, symbols or any other such alphanumerical depictions. For example, the graphical indicia can be one or more illustrations of an object and the alphanumerical indicia can be the name of the object. The object can be an animate object or an inanimate object, such as an animal or items such as a musical instrument, etc. as indicated in FIGS. 2 and 3. The object can also be a plurality of objects signifying a number. The object can be selected to represent a color, e.g. "cotton candy" to indicate the color pink, as shown in FIGS. 1A and 1B. Also, the object can be any type of icon or other symbol, e.g. a logo, a traffic sign or any other type of symbolic representation.

In a further realization of the invention, a third educational indicia can be formed on the flap 16, either on the inside or outside. The second educational indicia can be the name of an object given in a first language, and the third educational indicia can be the name of the object in a second language. As shown in FIGS. 1A and 1B, the first language is Spanish and the second language is English. In this way, the present flash cards can be used to teach vocabulary in a foreign language.

In a previous-type flash card, a "question" is on one side and an "answer" is on the other side. However, with the present invention, both a "question" and "answer" can be presented on the same side. This saves the user from having to flip the card over. Also, by presenting both associated indicia in the same field of view, the invention allows greater concept association, further reinforcing the lesson and improving the educational benefit obtained as compared with other flash card systems.

Another benefit that follows from the present design is that display surfaces can be made on both sides of the flash card 10. As generally indicated by FIG. 2, a first display surface 12a can be formed on one side of the card 10, and a second display surface 12b can be formed on the other side of the card 10. Each display surface can have a first educational indicia and/or a flap 16a, 16b for revealing a respective educational indicia. By using two sides in this way, more relevant information per topic can be added per card, increasing the educational value of the flash card.

The general construction of the preferred embodiment is shown in FIG. 2. A display surface 12a is formed on a first card layer 30, from which the flap 16a is cut out. The second educational indicia is formed on a second card layer 32. If a two-sided card 10 is contemplated, first indicia may be formed on both card layers 30, 32, and flaps 16a, 16b may be formed on each, but offset from each other so as to create a "hole" between opposing flap. Alternatively, as shown in FIG. 2, a third card layer 34 may be employed, with a display surface 12b and a flap 16b cut out therefrom. The respective layers are formed together as a laminate, e.g. with a suitable adhesive. In an alternative embodiment, as shown in FIG. 3, the flap 16 may be formed as a separate piece and affixed to a first card layer 30 with a suitable adhesive. In this embodiment, both first and second educational indicia are formed on the same display surface 12. In an exemplary embodiment, each flash card 10 includes card layers formed of a 250 gsm art board, coated one-side, and glued back-to-back to form the laminate. It should also be appreciated that more than one flap could be placed on each side of the card, so as to increase the amount of information contained on a certain card.

Figure 4A:
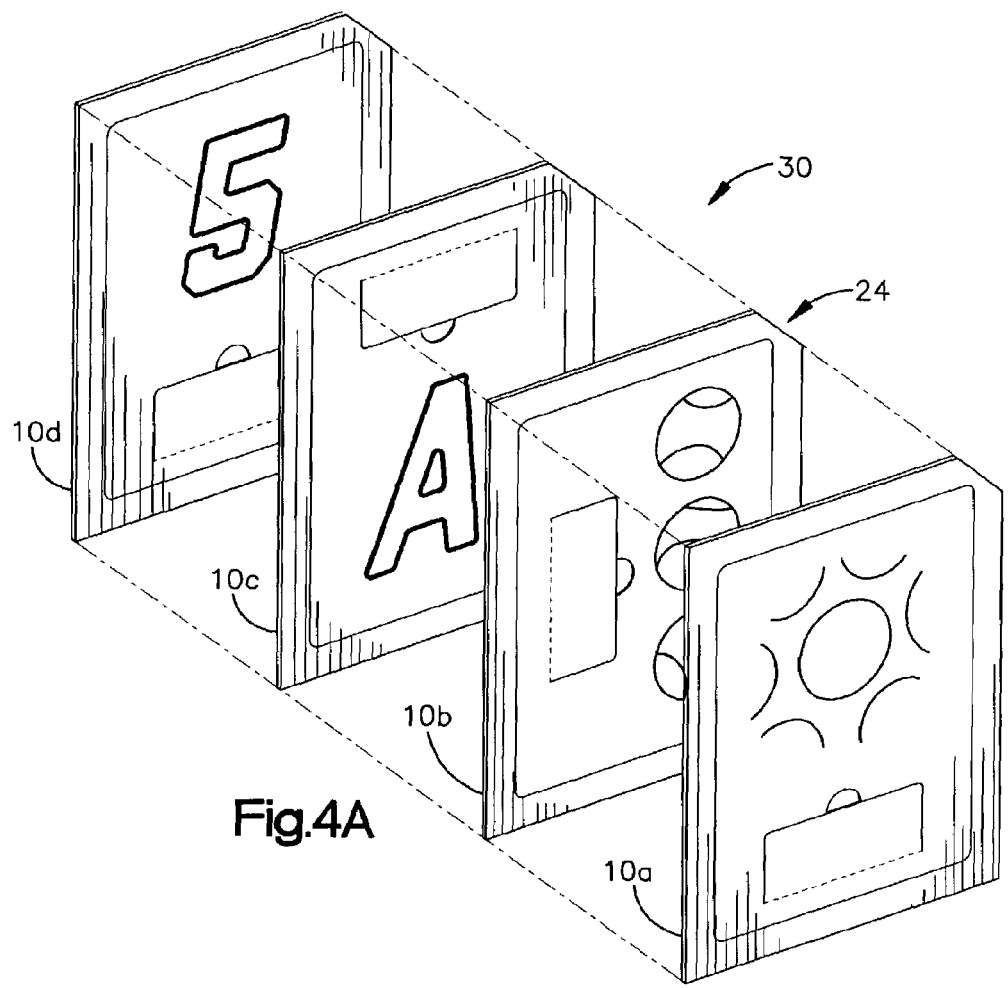
FIGS. 4A and 4B show a flash card system including a plurality of flash cards, in accordance with an embodiment of the present invention.
Figure 4B:
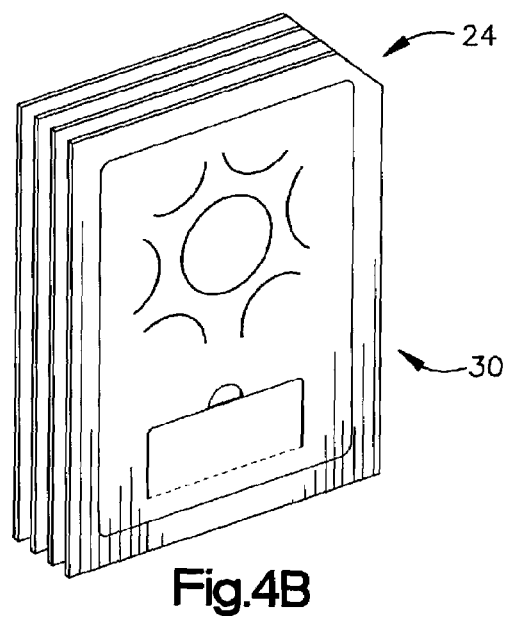

As indicated in FIGS. 4A and 4B, it should be appreciated that the present flash card 10 as disclosed is only one of a plurality of flash cards 10a, 10b, 10c, 10d, etc. in a flash card system 30. The system 30 can be a "deck" of flash cards for a particular subject area, or a plurality of subject areas. In another aspect of the invention, the display surface can also include a color-coded perimeter 22. A specific color can be associated with a specific subject area or other category of educational indicia. For example, blue can be used for alphabet flash cards, yellow to teach numbers, etc. Also, it may be desirable to have a specific side facing the user when the flash cards are stacked in a deck. To this end, a notched corner 24 is provided as especially indicated in FIGS. 4A and 4B. The notched corner 24 allows the cards to be aligned in a desired manner so that a specific predetermined sides of each card are facing the same direction. In this way, the cards 10 can be easily sorted into a desired orientation.

It should be appreciated that the present invention concept need not be limited to educational flash cards. Any type of display member can be considered that includes a display surface with a first indicia, and a displaceable flap for revealing a second indicia. This inventive concept can also be used for trading cards, e.g. baseball cards and the like, and also greeting cards, where the flap reveals a humorous or sentimental message. The concept can also be used with an advertisement to reveal a discount coupon or the like, and also for lottery tickets where an "instant winner" amount can be revealed under the flap. Naturally, any other type of display member could be contemplated without departing from the invention.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

The invention claimed is:

1. A double-sided flash card system comprising:
a plurality of double-sided flash cards, each double-sided flash card of the flash card system comprises:
a first side having a first display surface for displaying a first educational indicia;
a hinge-mounted flap on the first display surface for optionally revealing a second educational indicia which corresponds to the first educational indicia;
a second side opposite the first side, the second side having a second display surface for displaying third educational indicia, and a hinge-mounted flap on the second display surface for optionally revealing a fourth educational indicia which corresponds to the third educational indicia;
the first, second, third and fourth educational indicia being of common subject matter.

2. The flash card system of claim 1 wherein the first educational indicia comprises a question and the second educational indicia comprises an answer to the question.

3. The flash card system of claim 2 wherein the first and second educational indicia respectively comprise at least one question and at least one answer selected from a group comprising at least one of: mathematics; language; history and science.

4. The double-sided flash card system of claim 1 wherein at least one of the first, second, third or fourth educational indicia comprises graphical indicia and wherein the corresponding educational indicia comprises alphanumerical indicia.

5. The flash card system of claim 4 wherein the graphical indicia comprises at least one illustration of an object and the alphanumerical indicia comprises the respective name of the object.

6. The flash card system of claim 5 wherein the object comprises at least one of: an animate object; an inanimate object; a plurality of objects signifying a number, an object representing a color; and a symbol.

7. A double-sided flash card comprising:
a first side having a first panel with a display surface displaying a first educational indicia, the first panel having a hinge-mounted flap which can be moved to reveal a second panel with a display surface displaying a second educational indicia which corresponds to the first educational indicia on the first panel;
and a second side opposite the first side and having a third panel with a display surface displaying a third educational indicia, and a hinge-mounted flap which can be moved to reveal a fourth panel displaying a fourth educational indicia which corresponds to the third educational indicia;
the first, second, third and fourth educational indicia being of common subject matter.

8. The double-sided flash card of claim 7 wherein at least one of the first and second educational indicia comprises graphical indicia and the other of the first and second educational indicia comprises corresponding alphanumerical indicia.

9. The double-sided flash card of claim 7 wherein the graphical indicia comprises at least one illustration of an object and the alphanumerical indicia comprises a name of the object.

10. The flash card of claim 9 wherein the object comprises at least one of: an animate object; an inanimate object; a plurality of objects signifying a number, an object representing a color, and a symbol.

11. The flash card of claim 9 further comprising a third educational indicia formed on the flap.

12. The flash card of claim 11 wherein the second educational indicia comprises the name of the object in a first language and the third educational indicia comprises the name of the object in a respective second language.

13. The double-sided flash card of claim 7 wherein the flash card is one of a plurality of flash cards in a flash card system.

14. The double-sided flash card system of claim 7 wherein the display surface comprises a color-coded perimeter associated with a specific category of educational indicia.

15. A double-sided flash card for communicating information about a subject in four different ways, the double-sided flash card comprising:
- a first side having a first display panel which bears information in a first form about a subject;
- a flap on the first display panel which can be opened to reveal a second display panel which bears information in a second form about the subject;
- a second side having a third display panel which bears information in a third form about the subject, and a flap on the third display panel which can be opened to reveal a fourth display panel which bears information in a fourth form about the subject.

* * * * *